US011654929B2

(12) United States Patent
Maeda et al.

(10) Patent No.: US 11,654,929 B2
(45) Date of Patent: May 23, 2023

(54) STRADDLE TYPE VEHICLE AND CONTROL APPARATUS

(71) Applicant: HONDA MOTOR CO., LTD., Tokyo (JP)

(72) Inventors: Hiroshi Maeda, Tokyo (JP); Kazuyuki Fukaya, Tokyo (JP); Kineo Tomura, Tokyo (JP); Hiroaki Uchisasai, Tokyo (JP); Takayuki Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/190,644

(22) Filed: Mar. 3, 2021

(65) Prior Publication Data

US 2021/0284190 A1 Sep. 16, 2021

(30) Foreign Application Priority Data

Mar. 10, 2020 (JP) .............................. JP2020-041174

(51) Int. Cl.
*B60W 50/14* (2020.01)
*B60W 30/18* (2012.01)
*B60W 40/12* (2012.01)

(52) U.S. Cl.
CPC ...... *B60W 50/14* (2013.01); *B60W 30/18163* (2013.01); *B60W 40/12* (2013.01);
(Continued)

(58) Field of Classification Search
CPC ..... B60W 2050/143; B60W 2050/146; B60W 2300/36; B60W 2552/53; B60W 30/09;
(Continued)

(56) References Cited

U.S. PATENT DOCUMENTS 8,466,806 B2   6/2013  Schofield
9,187,117 B2  11/2015  Spero et al.
(Continued)

FOREIGN PATENT DOCUMENTS

JP   2008-102690 A      5/2008
JP   2008102690 A  *  5/2008
(Continued)

OTHER PUBLICATIONS

Office Action dated Jan. 17, 2022, issued in counterpart IN Application No. 202114009077, with English Translation. (6 pages).
(Continued)

*Primary Examiner* — Quan Zhen Wang
*Assistant Examiner* — Rajsheed O Black-Childress
(74) *Attorney, Agent, or Firm* — WHDA, LLP

(57) ABSTRACT

A straddle type vehicle includes a setting unit configured to set a warning line along a boundary between a traveling lane of a self-vehicle and an oncoming lane, a warning unit configured to issue a warning if the self-vehicle has crossed the warning line, a detection unit configured to detect a difficult-to-travel region in the traveling lane, and a determination unit configured to determine whether it is difficult or possible for the self-vehicle to pass between the boundary and the difficult-to-travel region. If it is determined by the determination unit that it is difficult for the self-vehicle to pass, the setting unit changes a position of the warning line to a position shifted from the boundary toward the oncoming lane side.

6 Claims, 12 Drawing Sheets

(52) U.S. Cl.
CPC ... *B60W 2050/146* (2013.01); *B60W 2552/53* (2020.02); *B60Y 2200/12* (2013.01)

(58) Field of Classification Search
CPC ........... B60W 30/10; B60W 30/18163; B60W 40/12; B60W 50/14; B60Y 2200/12
See application file for complete search history.

(56) References Cited

U.S. PATENT DOCUMENTS

| | | |
|---|---|---|
| 2010/0295707 A1 | 11/2010 | Bennie et al. |
| 2015/0097661 A1 | 4/2015 | Nilsson |
| 2020/0013113 A1 | 1/2020 | Tezuka et al. |

FOREIGN PATENT DOCUMENTS

| | | | |
|---|---|---|---|
| JP | 2015-087891 A | | 5/2015 |
| JP | 2015087891 A | * | 5/2015 |
| JP | 5896505 B2 | | 3/2016 |
| JP | 2019-77427 A | | 5/2019 |
| WO | 2018/179399 A1 | | 10/2018 |

OTHER PUBLICATIONS

Office Action dated Jan. 21, 2022, issued in counterpart JP Application No. 2020-041174, with partial English Translation. (4 pages).
Office Action dated Aug. 8, 2022, issued in counterpart JP application No. 2020-041174, with English translation. (3 pages).

* cited by examiner

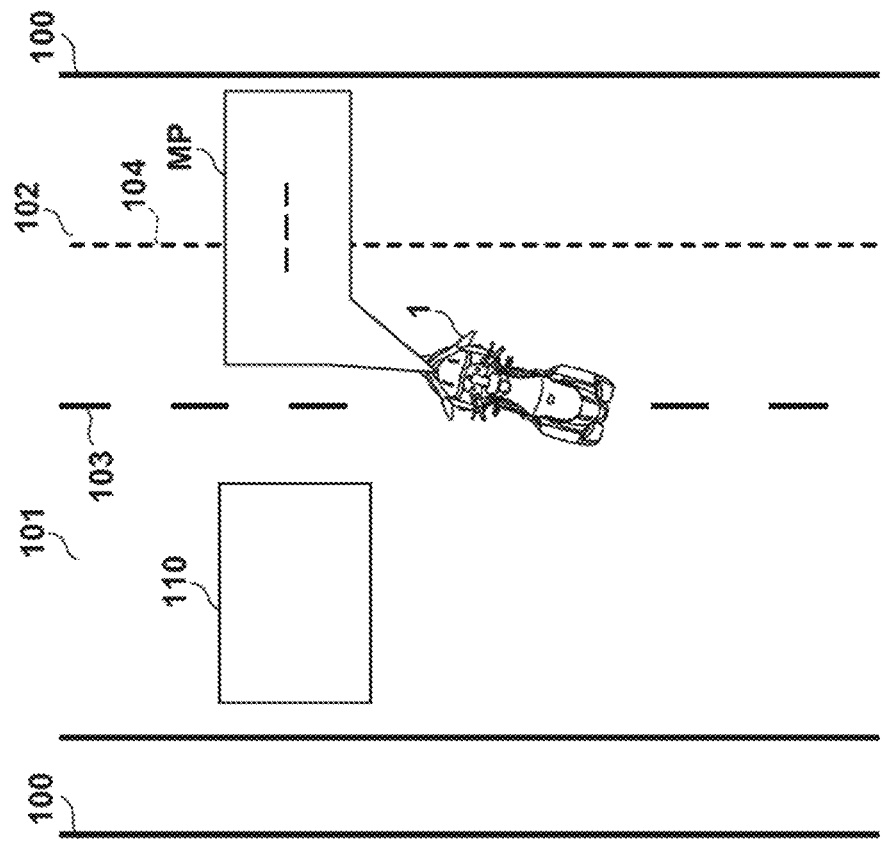
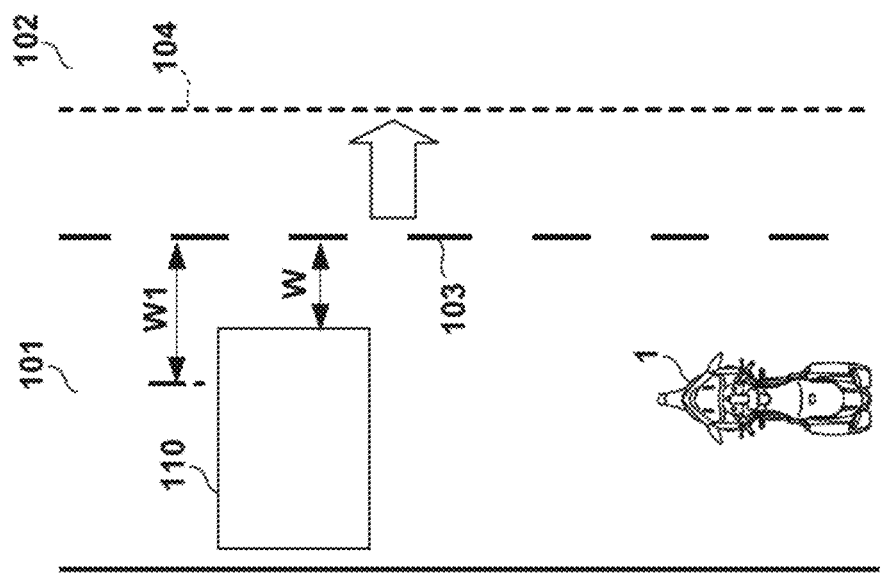

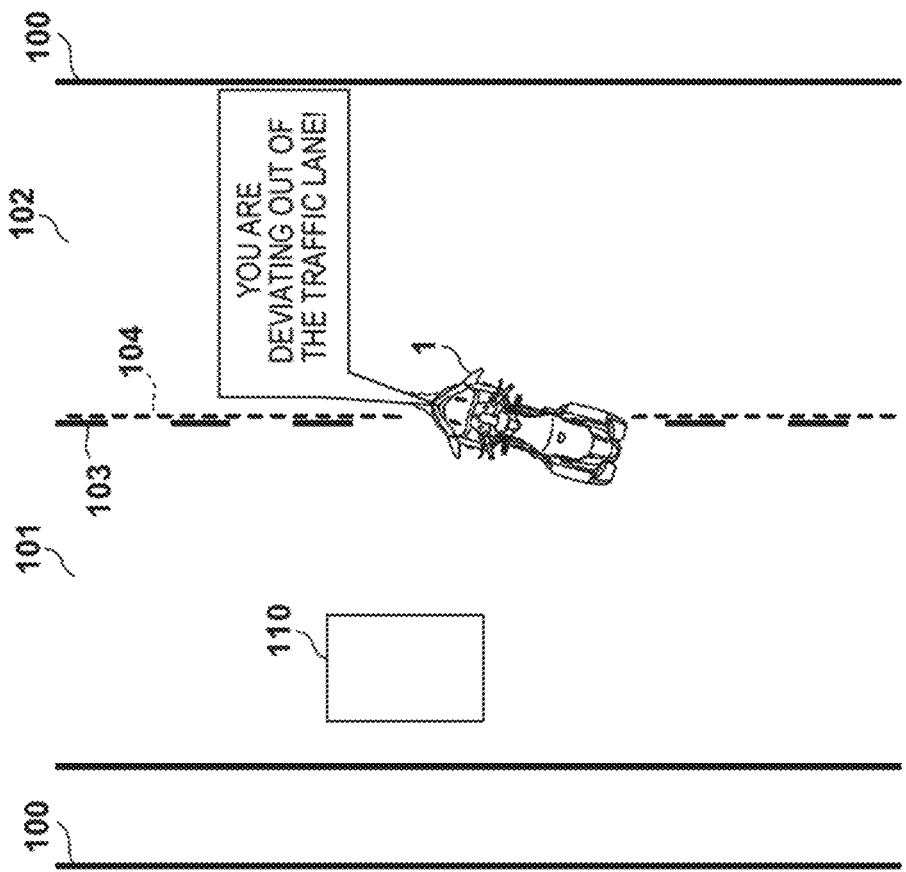
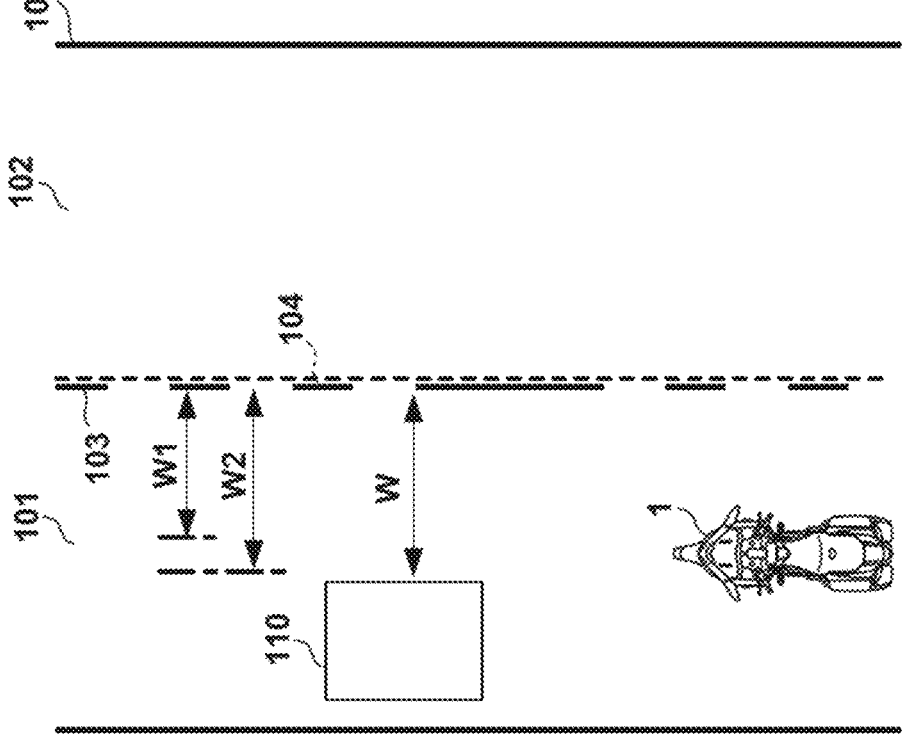

STRADDLE TYPE VEHICLE AND CONTROL APPARATUS

CROSS-REFERENCE TO RELATED APPLICATION(S)

This application claims priority to and the benefit of Japanese Patent Application No. 2020-041174 filed on Mar. 10, 2020, the entire disclosure of which is incorporated herein by reference.

BACKGROUND OF THE INVENTION

Field of the Invention

The present invention relates to a straddle type vehicle.

Description of the Related Art

A technique of issuing a warning if a vehicle deviates from a traffic lane is known as a driving assistance technique for vehicles. However, there are cases where a vehicle is forced to deviate from a traffic lane if there is another vehicle parked in the traffic lane of the self-vehicle or if road construction is taking place. Japanese Patent No. 5896505 proposes a technique of shifting the position for issuing a warning toward an oncoming lane side if an obstacle is present in a traveling lane, i.e., a traffic lane in which a self-vehicle is traveling, and the traveling lane is substantially narrowed.

Straddle type vehicles have a narrower vehicle width than four-wheeled vehicles, and can pass through a narrower space than a space through which four-wheeled vehicles can pass. Even if an obstacle were present in a traveling lane of a self-vehicle and the traveling lane were substantially narrowed, a straddle type vehicle would be able to travel without deviating into an oncoming lane in some cases.

SUMMARY OF THE INVENTION

An object of the present invention is to provide a technique that makes it possible to issue a warning of lane deviation that is appropriate for straddle type vehicles.

According to an aspect of the present invention, there is provided straddle type vehicle comprising: a setting unit configured to set a warning line along a boundary between a traveling lane of a self-vehicle and an oncoming lane; a warning unit configured to issue a warning if the self-vehicle has crossed the warning line; a detection unit configured to detect a difficult-to-travel region in the traveling lane; and a determination unit configured to determine whether it is difficult or possible for the self-vehicle to pass between the boundary and the difficult-to-travel region, if the difficult-to-travel region is detected by the detection unit, wherein if it is determined by the determination unit that it is difficult for the self-vehicle to pass, the setting unit changes a position of the warning line to a position shifted from the boundary toward the oncoming lane side, and if it is determined by the determination unit that it is possible for the self-vehicle to pass, the setting unit does not change the position of the warning line.

Further features of the present invention will become apparent from the following description of exemplary embodiments (with reference to the attached drawings).

BRIEF DESCRIPTION OF THE DRAWINGS

FIGS. 8A and 8B are explanatory diagrams showing an example operation.

FIGS. 9A and 9B are explanatory diagrams showing an example operation.

DESCRIPTION OF THE EMBODIMENTS

Figure 1:
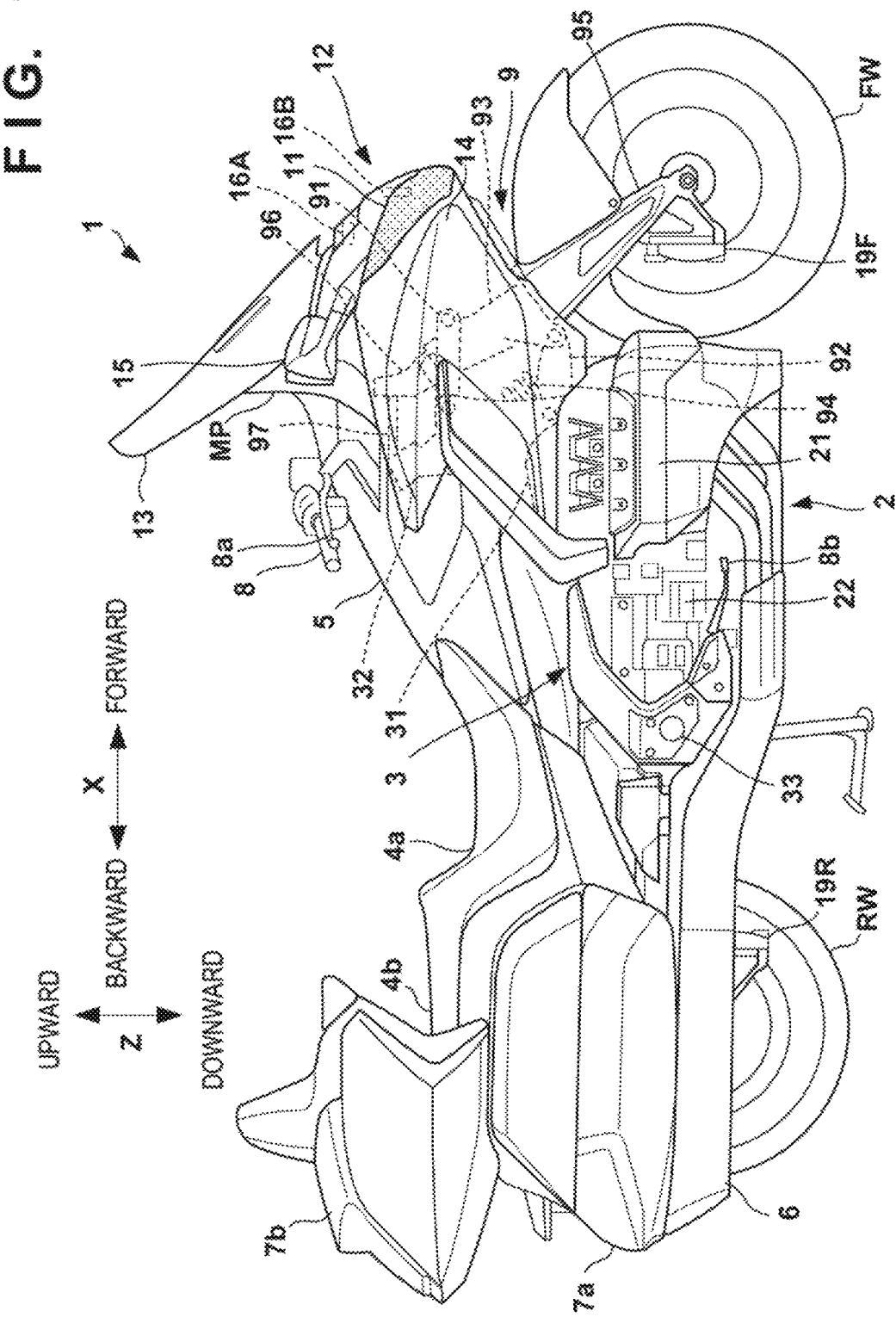
FIG. 1 is a right side view of a straddle type vehicle according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the diagrams, arrows X, Y, and Z indicate directions orthogonal to each other, an X direction is a front-back direction of a straddle type vehicle, a Y direction is a vehicle width direction (left-right direction) of the straddle type vehicle, and a Z direction is the vertical direction. The left and right of the straddle type vehicle are those as viewed in the forward direction. In the following description, the front side or the back side in the front-back direction of the straddle type vehicle is simply referred to as the front side or the back side in some cases. Also, the inner side or the outer side in the vehicle width direction (left-right direction) of the straddle type vehicle is simply referred to as the inner side or the outer side in some cases.

<Summary of Straddle Type Vehicle>

Figure 2:
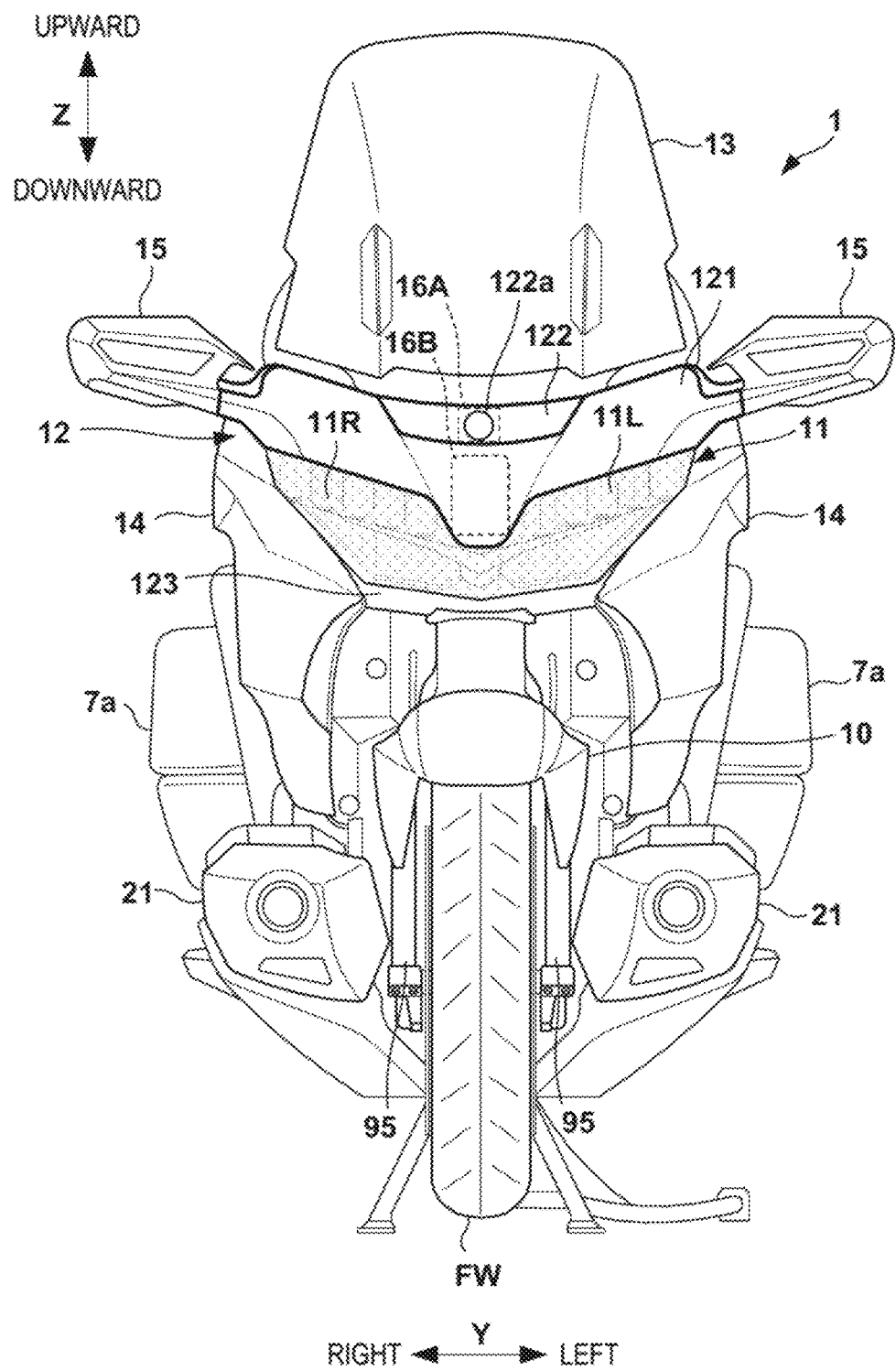
FIG. 2 is a front elevational view of the straddle type vehicle in FIG. 1.

FIG. 1 is a right side view of a straddle type vehicle 1 according to an embodiment of the present invention, and FIG. 2 is a front elevational view of the straddle type vehicle 1.

The straddle type vehicle 1 is a touring type automatic two-wheeled vehicle that is suitable for long-distance travel. However, the present invention can be applied to various straddle type vehicles including other types of automatic two-wheeled vehicles, and can also be applied to not only vehicles that use an internal combustion engine as a driving source but also electric vehicles that use a motor as a driving source. In the following description, the straddle type vehicle 1 is referred to as the vehicle 1 in some cases.

The vehicle 1 has a power unit 2 between a front wheel FW and a rear wheel RW. In the present embodiment, the power unit 2 includes a horizontally-opposed six-cylinder engine 21 and a transmission 22. The driving force of the transmission 22 is transmitted to the rear wheel RW via a drive shaft (not shown) and rotates the rear wheel RW.

The power unit 2 is supported by a vehicle body frame 3. The vehicle body frame 3 includes a pair of left and right main frames 31 that extend in the X direction. A fuel tank 5 and an air cleaner box (not shown) are arranged above the main frames 31. A meter panel MP, which includes an electronic image display device or the like for displaying various kinds of information to a rider, is provided in front of the fuel tank 5.

A head pipe 32, which pivotably supports a steering shaft (not shown) that is pivoted by a steering wheel 8, is provided at front end portions of the main frames 31. A pair of left and right pivot plates 33 are provided at rear end portions of the main frames 31. Lower end portions of the pivot plates 33 and front end portions of the main frames 31 are connected to each other by a pair of left and right lower arms (not shown), and the power unit 2 is supported by the main frames 31 and the lower arms. A pair of left and right seat rails (not shown) that extend backward are also provided at the rear end portions of the main frames 31, and the seat rails support a seat 4a on which the rider sits, a seat 4b on which a passenger sits, a rear trunk 7b, and so on.

A front end portion of a rear swing arm (not shown), which extends in the front-back direction, is swingably supported at the pivot plates 33. The rear swing arm can swing in the vertical direction, and the rear wheel RW is supported at a rear end portion of the rear swing arm. An exhaust muffler 6 for silencing exhaust emission of the engine 21 extends in the X direction on a side of a lower portion of the rear wheel RW. Left and right saddle bags 7a are provided on the sides of an upper portion of the rear wheel RW.

A front suspension mechanism 9, which supports the front wheel FW, is configured at the front end portions of the main frames 31. The front suspension mechanism 9 includes an upper link 91, a lower link 92, a fork supporter 93, a cushion unit 94, and a pair of left and right front forks 95.

The upper link 91 and the lower link 92 are arranged with a space therebetween in the vertical direction at the front end portions of the main frames 31. Rear end portions of the upper link 91 and the lower link 92 are swingably coupled to support portions 31a and 31b (FIG. 1), which are provided at the front end portions of the main frames 31. Front end portions of the upper link 91 and the lower link 92 are swingably coupled to the fork supporter 93. The upper link 91 and the lower link 92 extend in the front-back direction and are arranged substantially parallel to each other.

The cushion unit 94 has a structure in which a shock absorber is inserted into a coil spring, and an upper end portion of the cushion unit 94 is swingably supported by the main frames 31. A lower end portion of the cushion unit 94 is swingably supported by the lower link 92.

The fork supporter 93 forms a tubular shape and tilts backward. A front end portion of an upper link 21 is pivotably coupled to an upper front portion of the fork supporter 93. A front end portion of the lower link 92 is pivotably coupled to a lower rear portion of the fork supporter 93.

A steering axle 96 is supported at the fork supporter 93 so as to be able to rotate around the axis thereof. The steering axle 96 has an axle portion (not shown) that is inserted into the fork supporter 93. A bridge (not shown) is provided at a lower end portion of the steering axle 96, and the pair of left and right front forks 95 are supported at this bridge. The front wheel FW is rotatably supported by the front forks 95. An upper end portion of the steering axle 96 is coupled, via a link 97, to the steering shaft (not shown) that is pivoted by handle bars 8. The steering axle 96 rotates due to the handle bars 8 being steered, and the front wheel FW is steered.

The vehicle 1 has a brake device 19F for braking the front wheel FW, and a brake device 19R for braking the rear wheel RW. The brake devices 19F and 19R are configured such that the brake devices 19F and 19R can be activated by the rider operating a brake lever 8a or a brake pedal 8b. The brake devices 19F and 19R are, for example, disc brakes. When the brake devices 19F and 19R are not distinguished, these are collectively referred to as the brake devices 19.

A headlight unit 11 for emitting light forward of the vehicle 1 is arranged at a front portion of the vehicle 1. The headlight unit 11 of the present embodiment is a binocular type headlight unit that has a right light-emitting portion 11R and a left light-emitting portion 11L in a left-right symmetrical manner. However, a monocular type or trinocular type headlight unit, or a left-right asymmetrical binocular type headlight unit may alternatively be employed.

The front portion of the vehicle 1 is covered by a front cowl 12, and front side portions of the vehicle 1 are covered by a pair of left and right side cowls 14. A screen 13 is arranged above the front cowl 12. The screen 13 is a windshield for reducing wind pressure received by the rider during travel, and is formed with a transparent resin member, for example.

A pair of left and right side mirror units 15 are arranged on the sides of the front cowl 12. Side mirrors (not shown) for the rider to view backward are supported at the side mirror units 15.

In the present embodiment, the front cowl 12 is constituted by cowl members 121 to 123. The cowl member 121 extends in the Y direction and constitutes the main body of the front cowl 12, and the cowl member 122 constitutes an upper portion of the cowl member 121. The cowl member 123 is spaced apart downward from the cowl member 121.

An opening for exposing the headlight unit 11 is formed between the cowl member 121 and the cowl member 123 and between the left and right side cowls 14. An upper edge of this opening is demarcated by the cowl member 121, a lower edge is demarcated by the cowl member 123, and left and right side edges are demarcated by the side cowls 14.

An image capture unit 16A and a radar 16B, which serve as detection devices for detecting a situation in front of the vehicle 1, are arranged behind the front cowl 12. The radar 16B is, for example, a millimeter wave radar. The image capture unit 16A includes an image sensor such as a CCD image sensor or a CMOS image sensor, and an optical system such as a lens, and captures an image of the front of the vehicle 1. The image capture unit 16A is arranged behind the cowl member 122 that constitutes an upper portion of the front cowl 12. The cowl member 122 has an opening 122a, which is formed to penetrate the cowl member 122, and the image capture unit 16A captures an image of the front of the vehicle 1 through the opening 122a.

The radar 16B is arranged behind the cowl member 121. With the presence of the cowl member 121, the presence of the detection units 16 in the front view of the vehicle 1 can be made less noticeable, and the appearance of the vehicle 1 can be avoided from deteriorating. The cowl member 121 is formed with a material through which electromagnetic waves can be transmitted, such as resin.

The image capture unit 16A and the radar 16B are arranged at a center portion in the Y direction of the front cowl 12 as viewed from the vehicle front. By arranging the image capture unit 16A and the radar 16B at the center portion in the Y direction of the vehicle 1, a wider image-capture area and detection area can be obtained leftward and rightward in front of the vehicle 1, and a situation in front of the vehicle 1 can be better detected without being overlooked. Furthermore, since the front of the vehicle 1 can be monitored equally on the left and right side by one image capture unit 16A and one radar 16B, the invention is particularly advantageous in a configuration in which one image capture unit 16A and one radar 16B, rather than two or more image capture units 16A and radars 16B, are provided.

<Control Apparatus>

Figure 3:
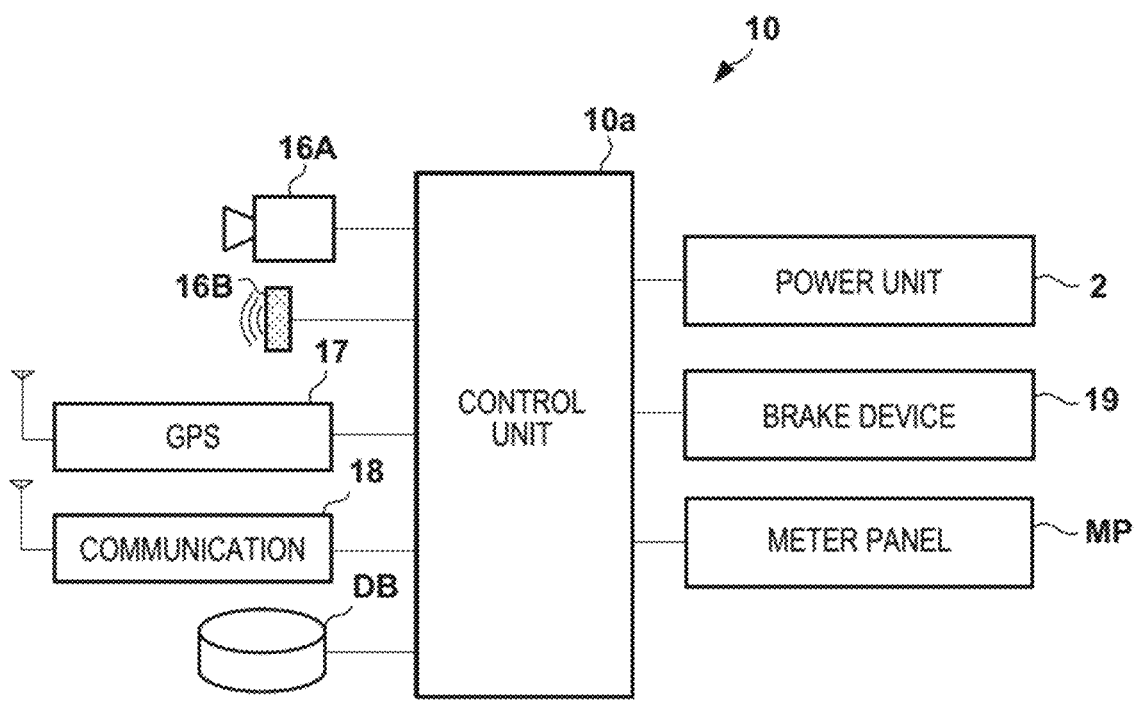
FIG. 3 is a block diagram of a control apparatus.

FIG. 3 is a block diagram of a control apparatus 10 of the vehicle 1, and only shows a necessary configuration in relation to the following description. The vehicle 1 has a control unit (ECU) 10a. The control unit 10a includes a processor, which is represented by a CPU, a storage device such as a semiconductor memory, an input-output interface or a communication interface for an external device, and so on. The storage device stores programs to be executed by the processor, data to be used in processing by the processor, and so on. The control unit 10a may include a plurality of sets of processors, storage devices, interfaces, and so on that correspond to respective functions of the vehicle 1.

The control unit 10a acquires results of detection by the image capture unit 16A and the radar 16B and constantly recognizes targets and a road condition around the vehicle 1. The control unit 10a also acquires information from a GPS sensor 17, a communication device 18, and a map information database DB. The GPS sensor 17 detects the current position of the vehicle 1. The communication device 18 wirelessly communicates with a server that provides map information and traffic information, and acquires such information. Highly precise map information can be stored in the map information database DB, and the control unit 10a can specify the shape of a road on which the vehicle 1 is traveling and the position of the vehicle 1 in a traffic lane with higher precision, based on this map information or the like.

The control unit 10a can control actuators of the power unit 2 and the brakes 19. In the present embodiment, the control unit 10a controls these actuators when performing later-described speed limit processing. The control unit 10a can also perform display control for the meter panel MP. In the present embodiment, various warnings to the rider are displayed on the meter panel MP. In the present embodiment, a warning is issued by displaying an image on the meter panel MP, but may alternatively be issued by lighting or flashing a lamp, or by a sound. Issue of a warning by means of sound may be controlled such that a sound is output from a speaker provided in the rider's helmet through wireless communication.

<Lane Deviation Warning>

Figure 4B:
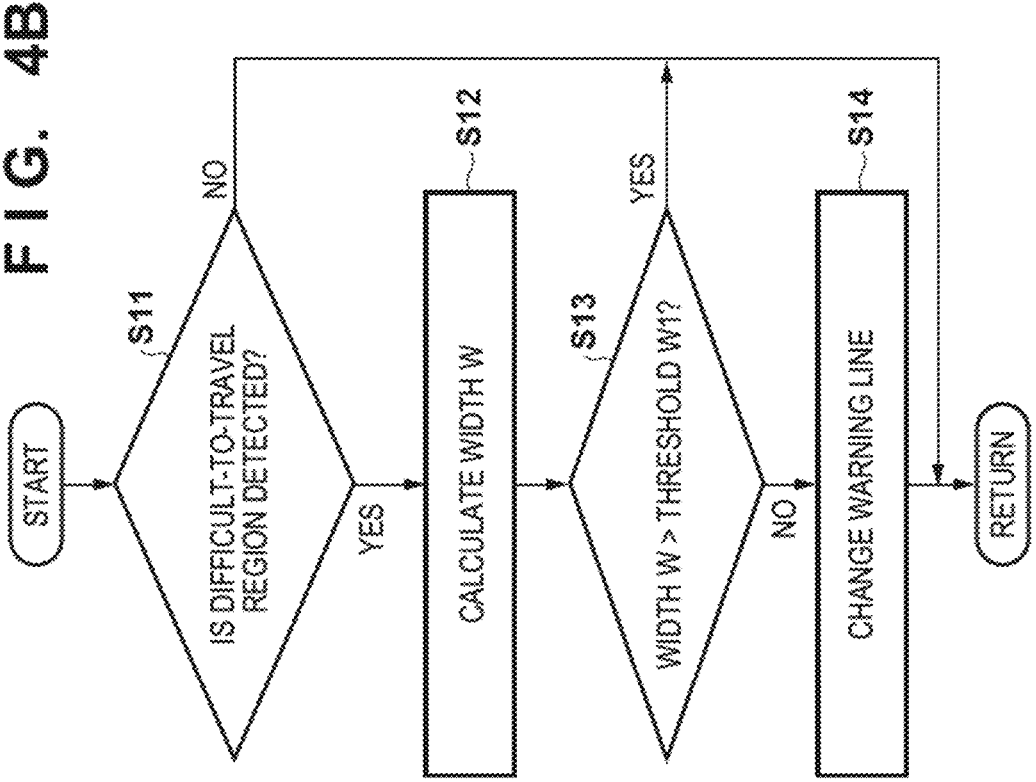
FIGS. 4A and 4B are flowcharts showing example processing of the control apparatus.
Figure 4A:
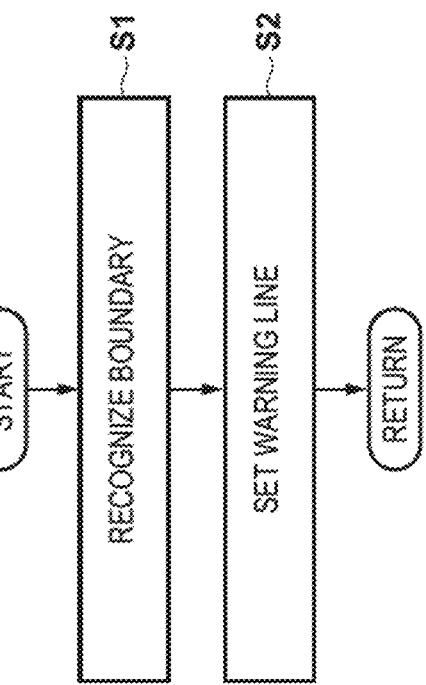

In the present embodiment, if the vehicle 1 deviates from a traveling lane, a warning is issued to the rider using the meter panel MP to call attention. The content of this processing will be described. First, a setting of a virtual warning line on a road that serves as a reference position for issuing a warning will be described. FIG. 4A is a flowchart related to warning line setting processing executed by the control unit 10a. The following example considers the case where left-handle drive is the rule of vehicle passage on the road. Processing described below is periodically and repeatedly executed by the control unit 10a.

In step S1, a boundary between a traveling lane and an oncoming lane is recognized using the result of the image capture unit 16A recognizing a road condition and the map information in the map information database DB. In step S2, a warning line is set at the position of the boundary recognized in step S1. FIGS. 6A, 7A, and 7B are explanatory diagram showing an example setting of a warning line. First, refer to FIG. 6A.

FIG. 6A shows an example of a road in which a traveling lane 101 and an oncoming lane 102 are demarcated by a median strip 103. On a road 100 on which the median strip 103 is present as in this example, the boundary between the traveling lane 101 and the oncoming lane 102 is recognized as the median strip 103, and a warning line 104 is set at the position of the median strip 103.

Next, refer to FIG. 7A. FIG. 7A shows an example of a road 100 without a median strip. In this case, with respect to a width L of the road 100, the position of L/2 from a width-end of the road 100 is recognized as a boundary 103' between the traveling lane 101 and the oncoming lane 102, and the warning line 104 is set at this position as shown in FIG. 7B.

Next, a change in the warning line will be described. There are cases where an obstacle such as a parked or stopped vehicle is present in the traveling lane and where passage through a part of the traveling lane is not allowed due to construction work. If such a difficult-to-travel region is present in the traveling lane, the vehicle 1 is forced to deviate into the oncoming lane. Accordingly, if the vehicle 1 is regarded as deviating from the traveling lane and a warning is issued, it may make the rider feel uncomfortable, and it is desirable that the warning line position is changed toward the oncoming lane side to suppress the issue of the warning.

Meanwhile, a straddle type vehicle has a smaller vehicle width than a four-wheeled vehicle, and particularly, an automatic two-wheeled vehicle has a width that is half or less the vehicle width of an automatic four-wheeled vehicle. Accordingly, even if a difficult-to-travel region is present in the traveling lane, there are cases where passage is substantially not affected. In the present embodiment, if a difficult-to-travel region is preset in the traveling lane, whether or not the vehicle 1 can pass along the traveling lane is determined. If it is difficult to pass, the position of the warning line 104 is changed, and if the vehicle 1 can pass, the position of the warning line 104 is maintained. FIG. 4(B) is a flowchart related to warning line setting processing executed by the control unit 10a.

In step S11, it is determined whether or not a difficult-to-travel region has been detected forward of the vehicle 1 in the traveling lane thereof, based on the result of recognizing a target in the traveling lane based on the results of detection by the image capture unit 16A and the radar 16B. If, for example, the presence of a parked or stopped vehicle, construction, or the like is detected, the difficult-to-travel region is set as a region that surrounds the detected target. If the difficult-to-travel region has been detected, the processing proceeds to step S12, and if not, one time of processing ends.

In step S12, a width W between the boundary between the traveling lane and the oncoming lane and the difficult-to-travel region is calculated. FIG. 8A shows an example of the width W. As shown in the diagram, the width W is the distance between the rightmost position of a difficult-to-travel region 110 and the boundary (median strip 103). In step S13, it is determined whether it is difficult or possible for the vehicle 1 to pass between the boundary between the traveling lane and the oncoming lane and the difficult-to-travel region, by comparing the width W with a threshold W1. FIGS. 6A and 8A show an example of the threshold W1.

The threshold W1 is a width with which the vehicle 1 can pass, and is, for example, a width that is twice the vehicle width of the vehicle 1.

If it is determined in step S13 that the width W is smaller than or equal to the threshold W1, it is determined that it is difficult for the vehicle 1 to pass by the difficult-to-travel region without deviating into the oncoming lane, and the warning line 104 is changed. FIG. 8A shows an example of the position of the changed warning line 104. For example, the warning line 104 is changed to a position shifted toward the oncoming lane 102 side by the width that is twice the vehicle width of the vehicle 1. If it is determined in step S13 that the width W exceeds the threshold W, it is determined that the vehicle 1 can pass by the difficult-to-travel region without deviating into the oncoming lane, and the warning line 104 is not changed. FIG. 9A shows an example in which the position of the warning line 104 is not changed.

Figure 5B:
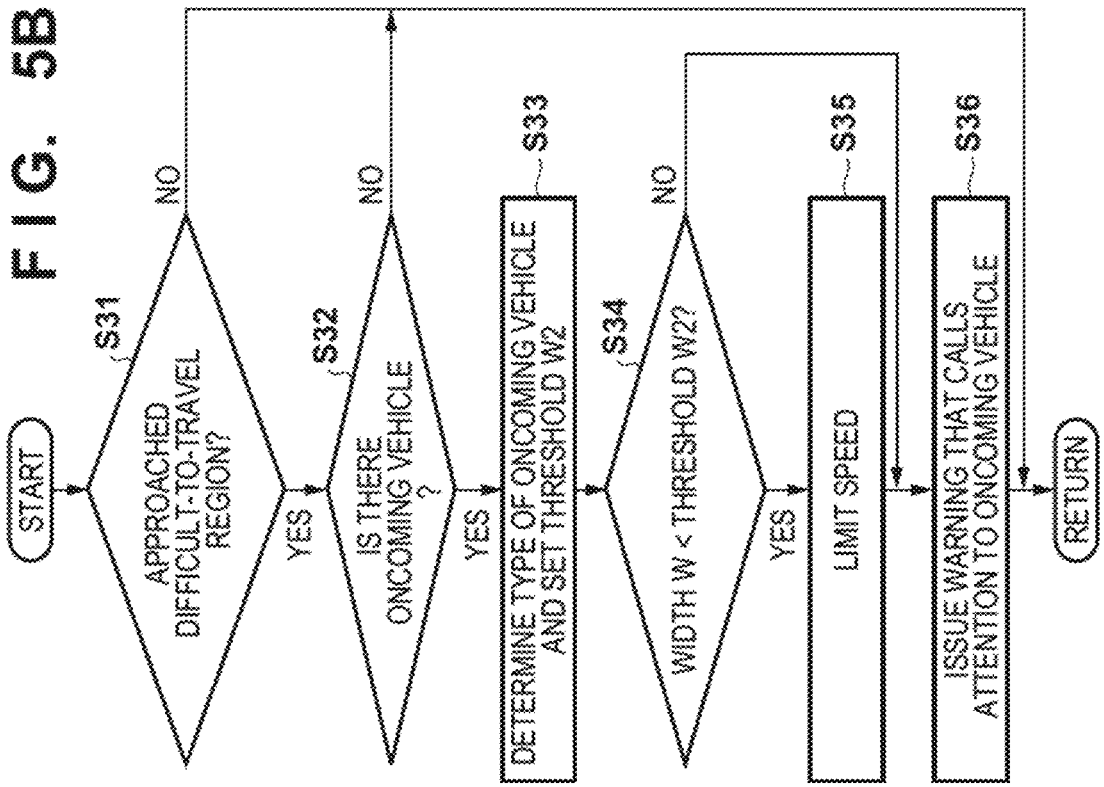
FIGS. 5A and 5B are flowcharts showing example processing of the control apparatus.
Figure 5A:
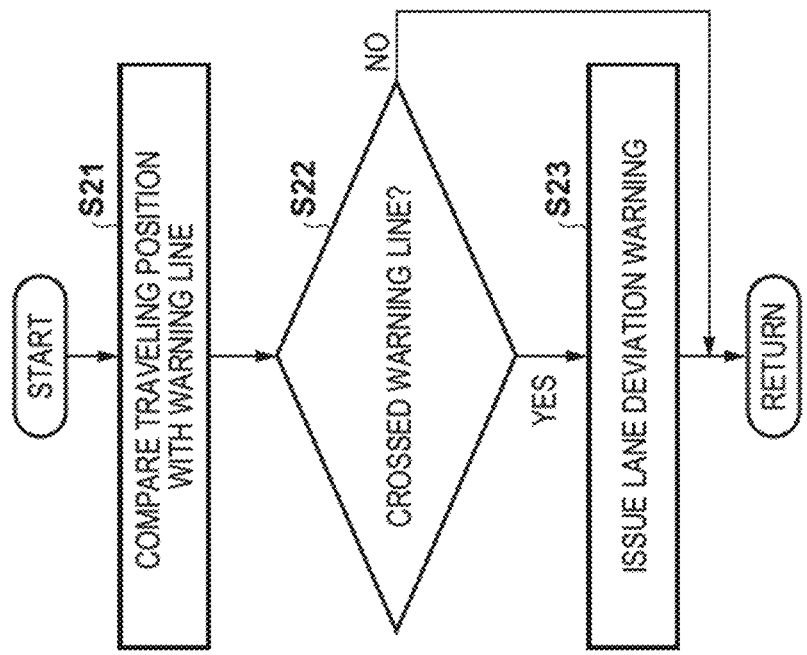

Next, an example of control performed when a warning is issued will be described. FIG. 5A is a flowchart thereof. In step S21, the traveling position of the vehicle 1 on the road in the width direction is compared with the position of the warning line 104. In step S22, whether or not the vehicle 1 has crossed the warning line 104 is determined based on the result of the comparison in step S21. If it is determined that the vehicle 1 has not crossed the warning line, one time of processing ends. If it is determined that the vehicle 1 has crossed the warning line, processing proceeds to step S23, and a warning for informing the rider of lane deviation is issued.

Figure 6B:
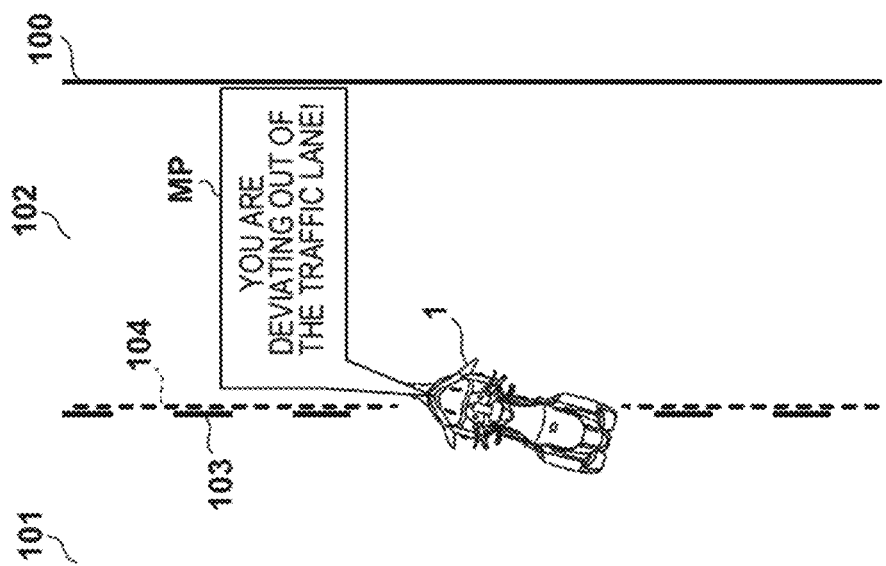
FIGS. 6A and 6B are explanatory diagrams showing an example operation.
Figure 6A:
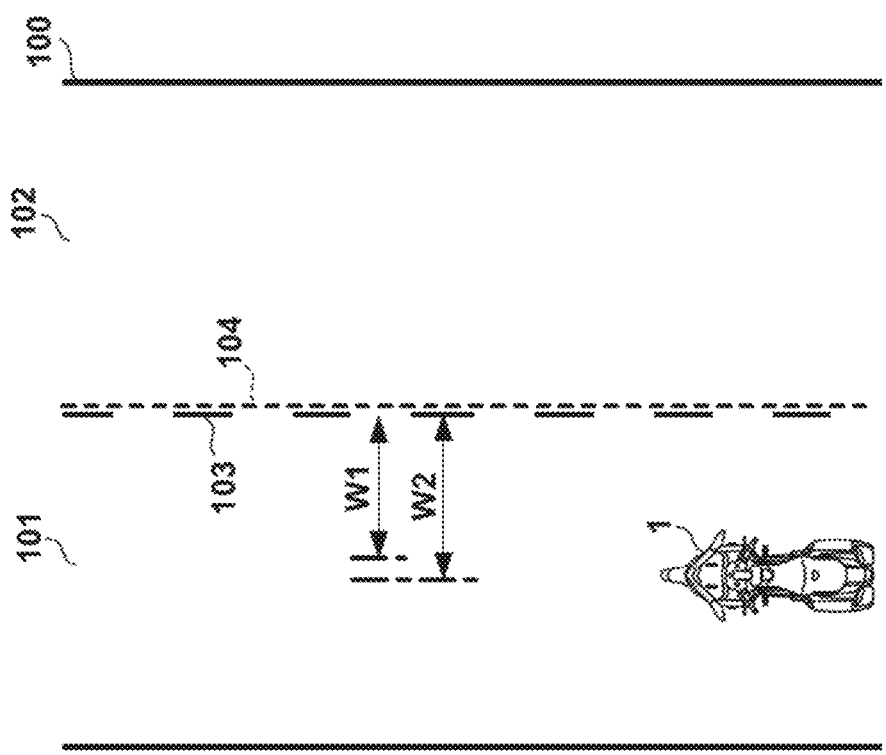
Figure 7B:
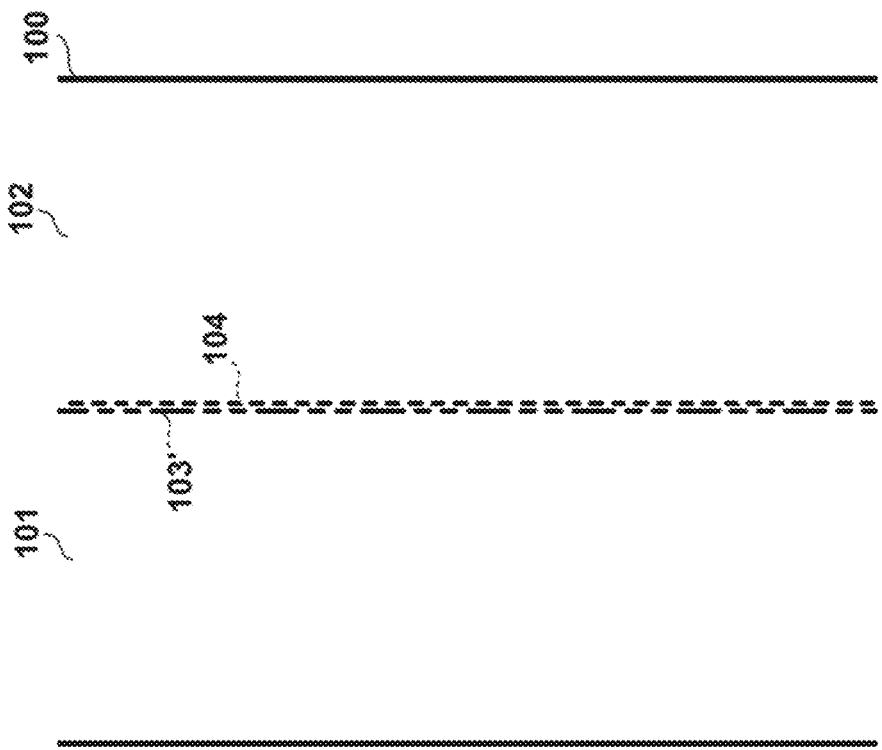
FIGS. 7A and 7B are explanatory diagrams showing an example operation.
Figure 7A:
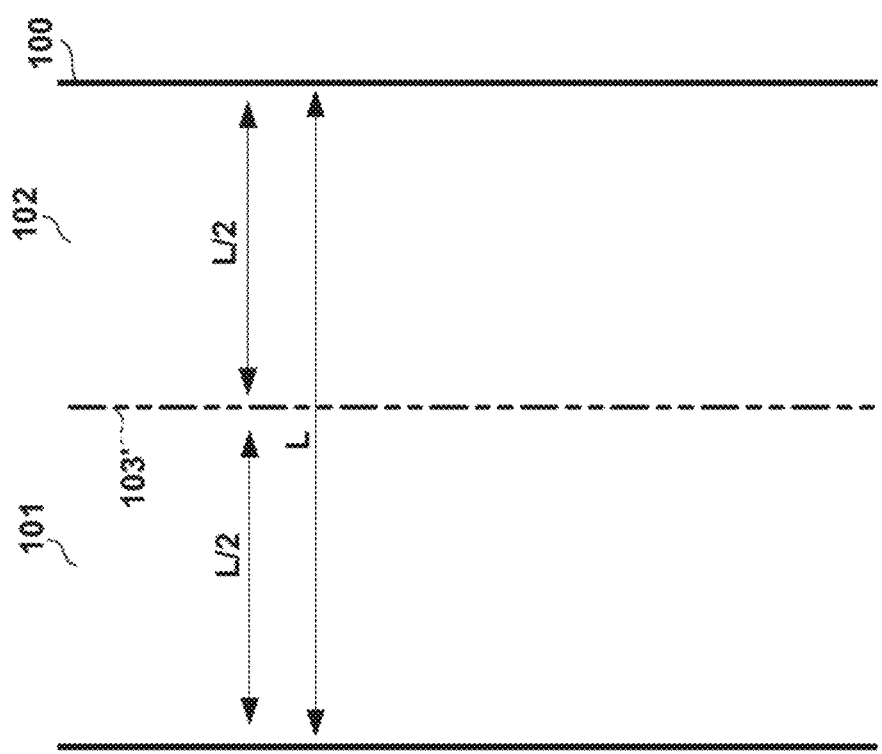

FIGS. 6A and 6B show an example setting of the warning line 104 and an example of issuing a warning. In the example in FIG. 6A, no difficult-to-travel region is present in the traveling lane 101, and the warning line 104 is set on the median strip 103. FIG. 6B shows a state where the vehicle 1 has crossed the warning line 104 and deviated into the oncoming lane 102. A warning is displayed on the meter panel MP to alert the rider.

FIGS. 8A and 8B show an example setting of the warning line 104 and an example of not issuing a warning. In the example in FIG. 8A, the difficult-to-travel region 110 is present in the traveling lane 101, and a relationship in which the width W<the threshold W1 holds. For this reason, the warning line 104 is set at a position shifted from the median strip 103 toward the oncoming lane 102 side. FIG. 8B shows a state where the vehicle 1 has crossed the median strip 103 and deviated into the oncoming lane 102. Since the vehicle 1 has not crossed the warning line 104, a warning is not displayed on the meter panel MP.

FIGS. 9A and 9B also show an example setting of the warning line 104 and an example of issuing a warning line. In the example in FIG. 9A, the difficult-to-travel region 101 is present in the traveling lane 110, and a relationship in which the width W>the threshold W1 holds. For this reason, the warning line 104 is maintained on the median strip 103. FIG. 9B shows a state where the vehicle 1 has crossed the median strip 103 and deviated into the oncoming lane 102. Since the vehicle 1 has crossed the warning line 104, a warning is displayed on the meter panel MP to alert the rider.

As described above, in the present embodiment, the position of the warning line 104 is changed while considering not only the presence of the difficult-to-travel region 110 but also whether or not the vehicle 1 can pass by the difficult-to-travel region 110 without deviating into the oncoming lane, and thus, a warning of lane deviation that is appropriate for a straddle type vehicle can be issued without unnecessarily changing the warning line 104.

<Warning about Presence of Oncoming Vehicle>

When the vehicle 1 passes by the difficult-to-travel region 104, there are cases where the vehicle 1 approaches the median strip 103. If an oncoming vehicle is present in the oncoming lane 102, safety can be enhanced by alerting the rider. In addition, if the width W is small, safety of the rider can be further enhanced if the speed of the vehicle 1 is limited. In the present embodiment, when the vehicle 1 passes by the difficult-to-travel region 104, a warning is issued to the rider if an oncoming vehicle is present in the oncoming lane 102. Furthermore, a speed limit is imposed on the vehicle 1 if the width W is small. FIG. 5B is a flowchart showing an example control.

In step S31, the current position of the vehicle 1 is compared with the position of the difficult-to-travel region 110, and it is determined whether or not the vehicle 1 has approached the difficult-to-travel region 110 (has reached a predetermined distance from the difficult-to-travel region 110). If it is determined that the vehicle 1 has approached the difficult-to-travel region 110, the processing proceeds to step S32, and it is determined whether or not any oncoming vehicle is present in the oncoming lane 102 based on the result of recognizing a target in the oncoming lane based on the results of detection by the image capture unit 16A and the radar 16B. If it is determined that an oncoming vehicle is present, the processing proceeds to step S33.

In step S33, the type of the oncoming vehicle is determined, and a threshold W2 is set. The threshold W2 is a threshold for evaluating the narrowness of the width W, and a relationship in which the threshold W1<the threshold W2 holds, as shown as an example in FIG. 6A. If the width W is small, the vehicle 1 is required to be careful when passing by the difficult-to-travel region 110. Accordingly, a speed limit is imposed. For example, the width W2 is a value in the range from 2 to 3.5 times the vehicle width of the vehicle 1. Although the threshold W2 may be a fixed value, in the present embodiment, the threshold W2 is varied depending on the type of the oncoming vehicle. If the oncoming vehicle is a four-wheeled vehicle, the traveling space of the vehicle 1 is narrow when the vehicle 1 deviates into the oncoming lane 102. If the oncoming vehicle is a two-wheeled vehicle, the traveling space of the vehicle 1 is wider than in the case of the four-wheeled vehicle when the vehicle 1 deviates into the oncoming lane 102. Accordingly, if the oncoming vehicle is a four-wheeled vehicle, the threshold W2 is set to a relatively large value, e.g., a value in the range from 3.0 to 3.5 times the vehicle width of the vehicle 1. If the oncoming vehicle is a two-wheeled vehicle, the threshold W2 is set to a relatively small value, e.g., a value in the range from 2.0 to 3.0 times the vehicle width of the vehicle 1.

In step S34, the width W calculated in step S12 is compared with the threshold W2 set in step S33. If the width W is smaller than the threshold W2, the processing proceeds to step S35, and if the width W is not smaller than the threshold W2, the processing proceeds to step S36. In step S35, processing related to the speed limit is performed. The processing related to the speed limit may be, for example, processing for not allowing acceleration from the current vehicle speed, or for decelerating to a predetermined speed. The control for not allowing acceleration from the current vehicle speed may be a control for not increasing the output of the power unit 2 but maintaining the current output, with respect to the rider's operation to the accelerator pedal. The control for decelerating to the predetermined speed may be a control for performing braking with the brake devices 19 and/or reducing the output of the power unit 2.

In step S36, a warning that calls attention to the oncoming vehicle is issued to the rider. In the present embodiment, this warning is also displayed on the meter panel MP.

Figure 10A:
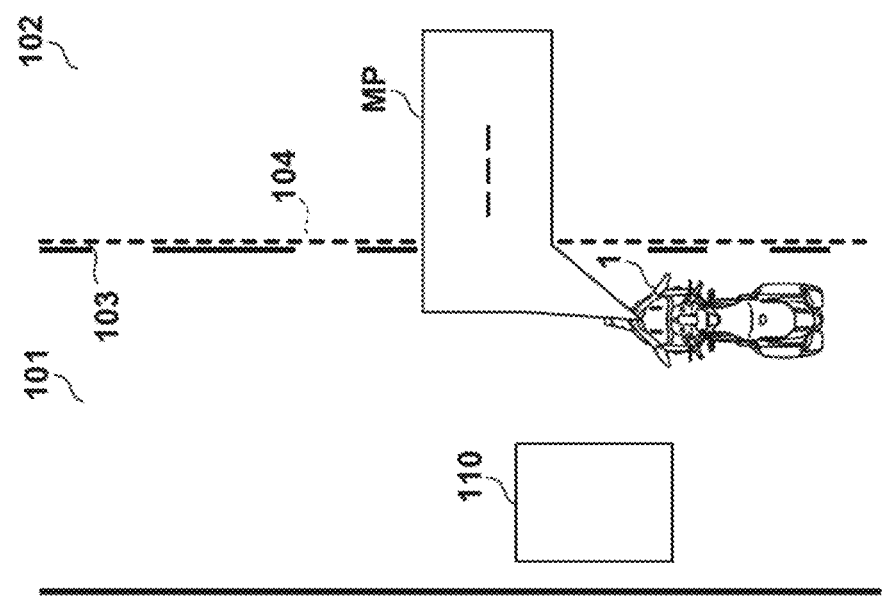
FIGS. 10A and 10B are explanatory diagrams showing an example operation.
Figure 10B:
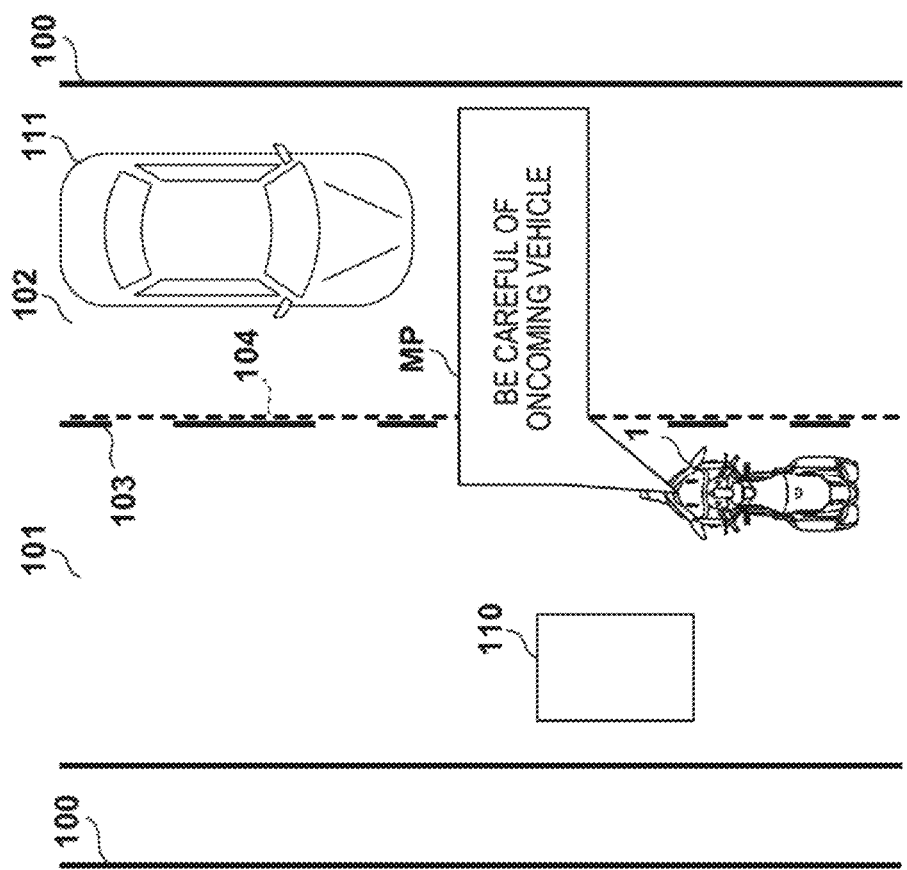

FIGS. 10A and 10B show examples of issue and not issuing a warning depending on the presence of an oncoming vehicle. In the example in FIG. 10A, although the vehicle 1 is approaching the difficult-to-travel region 110, no warning is displayed on the meter panel MP since no oncoming vehicle is present in the oncoming lane 102. In the example in FIG. 10B, since the vehicle 1 is approaching the difficult-to-travel region 110, and an oncoming vehicle 111 is present in the oncoming lane 102, a warning is displayed on the meter panel MP, and the rider is alerted when the vehicle 1 passes by the difficult-to-travel region 110.

Figure 11B:
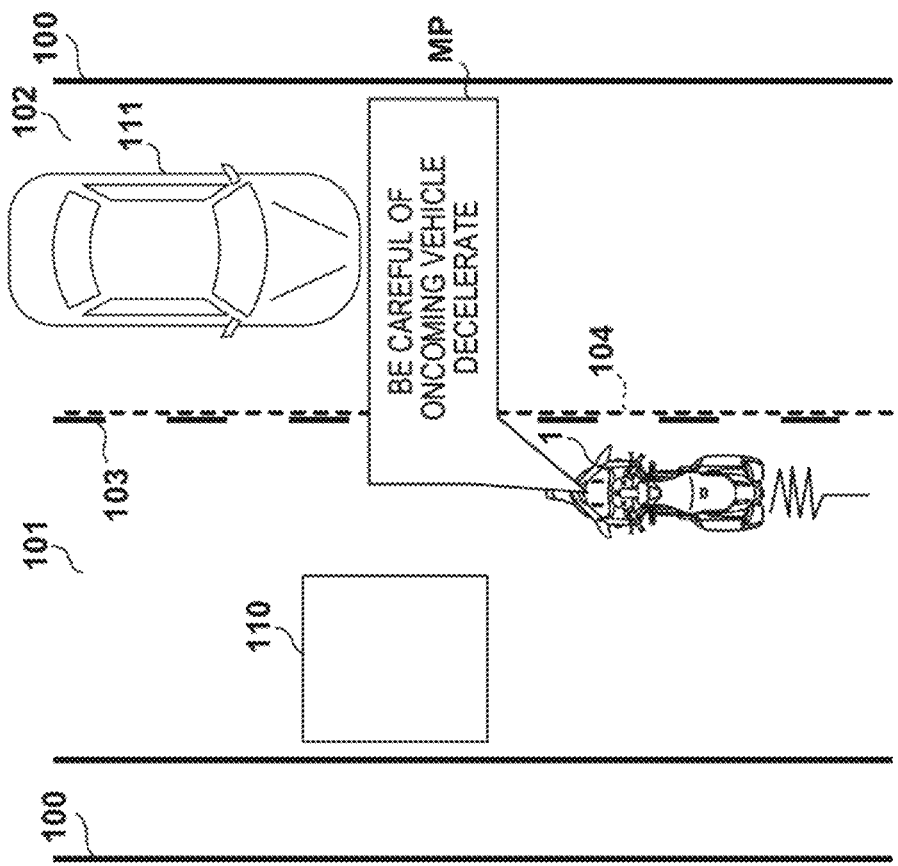
FIGS. 11A and 11B are explanatory diagrams showing an example operation.
Figure 11A:
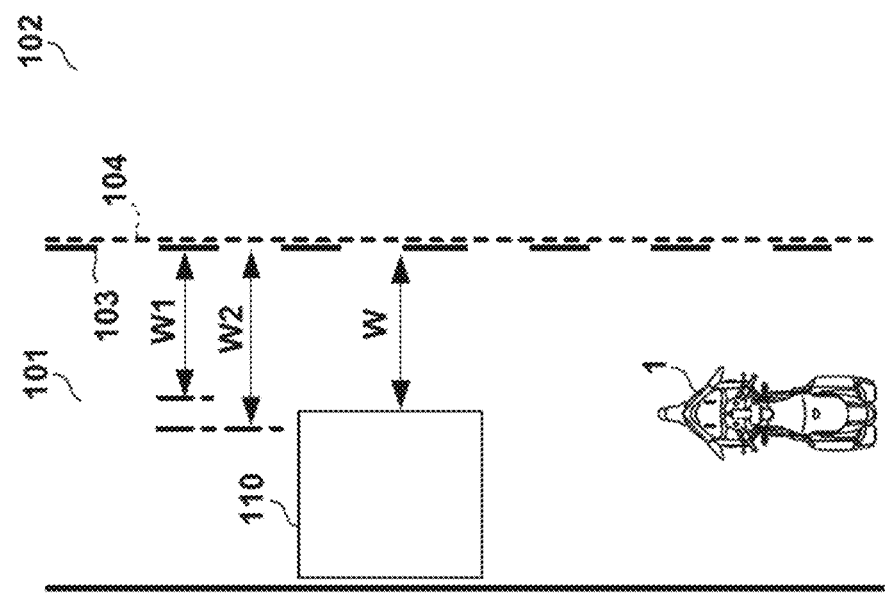

FIGS. 11A and 11B show examples of issuing a warning and limiting speed depending on the presence of an oncoming vehicle. FIG. 11A shows the relationship between the width W and the thresholds W1 and W2. In the example in this figure, a relationship in which the width W>the threshold W1 holds, and the warning line 104 is set on the median strip 103. Meanwhile, a relationship in which the width W<the threshold W2 holds, and the width W is small. In the example in FIG. 11B, since the vehicle 1 is approaching the difficult-to-travel region 110, and the oncoming vehicle 111 is present in the oncoming lane 102, a warning is displayed on the meter panel MP, and the rider is alerted when the vehicle 1 passes by the difficult-to-travel region 110. The oncoming vehicle 111 is a four-wheeled vehicle. Furthermore, as an example of a speed limit, the brake devices 19 are activated, and the vehicle 1 is automatically decelerated. A message indicating that automatic deceleration control is executed is also displayed on the meter panel MP.

Figure 12A:
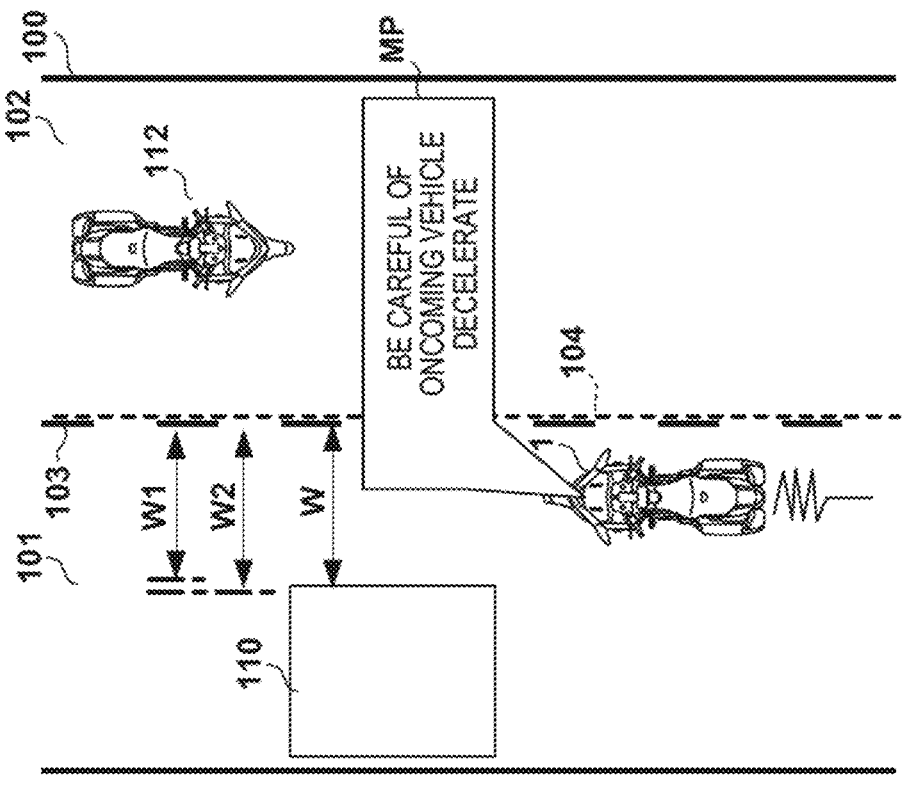
FIGS. 12A and 12B are explanatory diagrams showing an example operation.
Figure 12B:
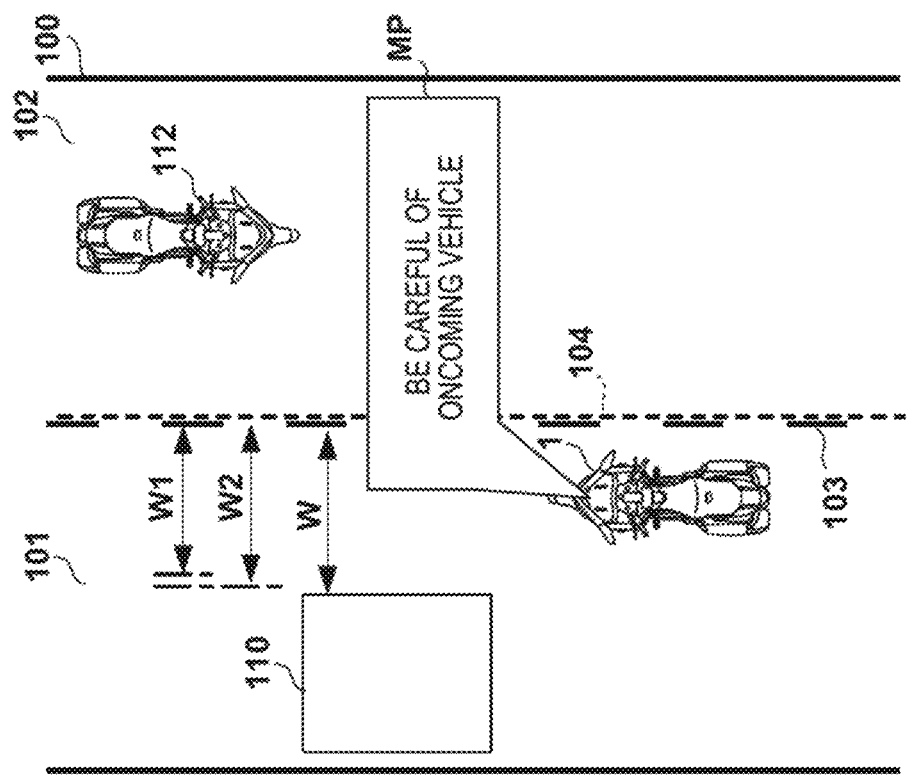

FIGS. 12A and 12B also show examples of issuing a warning and limiting speed depending on the presence of an oncoming vehicle. In the example in FIG. 12A, since the vehicle 1 is approaching the difficult-to-travel region 110 and an oncoming vehicle 112 is present in the oncoming lane 102, a warning is displayed on the meter panel MP, and the rider is alerted when the vehicle 1 passes by the difficult-to-travel region 110. The oncoming vehicle 112 is a two-wheeled vehicle. The threshold W2 is set smaller than that in the example in FIG. 11A in which the oncoming vehicle 111 is a four-wheeled vehicle. In the example in FIG. 12A, a relationship in which the width W>the threshold W2 holds. For this reason, a speed limit is not imposed.

In the example in FIG. 12B, since the vehicle 1 is approaching the difficult-to-travel region 110, and the oncoming vehicle 112 is present in the oncoming lane 102, a warning is displayed on the meter panel MP, and the rider is alerted when the vehicle 1 passes by the difficult-to-travel region 110. The oncoming vehicle 112 is a two-wheeled vehicle. In the example in FIG. 12B, a relationship in which the width W<the threshold W2 holds. For this reason, further, as an example of a speed limit, the brake devices 19 are activated, and the vehicle 1 is automatically decelerated. A message indicating that automatic deceleration control is executed is also displayed on the meter panel MP.

<Another Method for Determining Whether or not it is Difficult to Pass>

In the example in FIG. 4B, it is determined whether it is difficult or possible for the vehicle 1 to pass between the boundary between the traveling lane and the oncoming lane and the difficult-to-travel region, by comparing the width W with the threshold W1. However, any other determination methods may be employed. For example, if the difficult-to-travel region is due to parking or stopping of a vehicle, the determination may be performed in accordance with the type of the parked or stopped vehicle. Specifically, if the parked or stopped vehicle is a two-wheeled vehicle, it can be considered that a relatively wide space is present between the boundary and the difficult-to-travel region since the vehicle width of the parked or stopped vehicle is small. Accordingly, if the parked or stopped vehicle is a two-wheeled vehicle, it is determined that the vehicle 1 can pass. On the other hand, if the parked or stopped vehicle is a four-wheeled vehicle, it can be considered that the space between the boundary and the difficult-to-travel region is small since the vehicle width of the parked or stopped vehicle is large. Accordingly, if the parked or stopped vehicle is a four-wheeled vehicle, it is determined that it is difficult for the vehicle 1 to pass. With this determination method, it can be relatively readily determined whether it is difficult or possible for the vehicle 1 to pass. The presence and the type of the parked or stopped vehicle may be determined based on the result of recognizing a target based on the result of detection by the image capture unit 16A.

Summary of Embodiment

The above embodiment at least discloses the following straddle type vehicle and control apparatus.

1. A straddle type vehicle (1) of the above embodiment includes:

a setting unit (10a, S2) configured to set a warning line (104) along a boundary (103) between a traveling lane (101) of a self-vehicle and an oncoming lane (102);

a warning unit (MP, 10a, S23) configured to issue a warning if the self-vehicle has crossed the warning line;

a detection unit (16A, 16B) configured to detect a difficult-to-travel region in the traveling lane; and a determination unit (10a, S13) configured to determine whether it is difficult or possible for the self-vehicle to pass between the boundary and the difficult-to-travel region, if the difficult-to-travel region is detected by the detection unit, wherein if it is determined by the determination unit that it is difficult for the self-vehicle to pass, the setting unit changes a position of the warning line to a position shifted from the boundary toward the oncoming lane side, and if it is determined by the determination unit that it is possible for the self-vehicle to pass, the setting unit does not change the position of the warning line (10a, S13, S14).

According to this embodiment, a technique can be provided that makes it possible to issue a warning of lane deviation that is appropriate for a straddle type vehicle.

2. In the above embodiment, if a distance (W) between the boundary and the difficult-to-travel region is smaller than or equal to a predetermined distance (W1), the determination unit determines that it is difficult for the self-vehicle to pass (S13).

According to this embodiment, it is relatively readily determined that it is difficult for the self-vehicle to pass.

3. In the above embodiment, if the difficult-to-travel region is due to parking or stopping of a vehicle, the determination unit determines whether it is difficult or possible for the self-vehicle to pass, based on a type of the parked or stopped vehicle.

According to this embodiment, it is relatively readily determined that it is difficult for the self-vehicle to pass.

4. In the above embodiment, the detection unit detects another vehicle (111, 112) traveling in the oncoming lane, and if the determination unit determines that it is possible for the self-vehicle to pass, and the detection unit detects the other vehicle, the warning unit issues a warning even if the self-vehicle has not crossed the warning line (MP, 10a, S36).

According to this embodiment, it is possible to call the rider's attention to the oncoming vehicle.

5. In the above embodiment, a limiting unit (10a, S35) is further provided that limits speed of the self-vehicle if the determination unit determines that it is possible for the self-vehicle to pass, the detection unit detects the other vehicle, and a width (W) between the boundary and the difficult-to-travel region is smaller than a threshold (W2).

According to this embodiment, the rider can more safely travel by the difficult-to-run area.

6. In the above embodiment, a type determination unit (10a, S33) configured to determine a type of the other vehicle is further provided, wherein the threshold is set smaller when it is determined by the type determination unit that the other vehicle is a two-wheeled vehicle than when it is determined by the type determination unit that the other vehicle is a four-wheeled vehicle (10a, S33).

According to this embodiment, the speed limit can be executed to the extent necessary.

7. A control apparatus (10) of the above embodiment is a control apparatus for a straddle type vehicle (1), the apparatus including:

a setting unit (10a, S2) configured to set a warning line (104) along a boundary (103) between a traveling lane (101) of a self-vehicle and an oncoming lane (102);

a warning unit (MP, 10a, S23) configured to issue a warning if the self-vehicle has crossed the warning line;

a detection unit (16A, 16B) configured to detect a difficult-to-travel region in the traveling lane; and a determination unit (10a, S13) configured to determine whether it is difficult or possible for the self-vehicle to pass between the boundary and the difficult-to-travel region, if the difficult-to-travel region is detected by the detection unit, wherein if it is determined by the determination unit that it is difficult for the self-vehicle to pass, the setting unit changes a position of the warning line to a position shifted from the boundary toward the oncoming lane side, and if it is determined by the determination unit that it is possible for the self-vehicle to pass, the setting unit does not change the position of the warning line (10a, S13, S14).

According to this embodiment, a technique can be provided that makes it possible to issue a warning of lane deviation that is appropriate for a straddle type vehicle.

Although the embodiment of the invention has been described, The invention is not limited to the foregoing embodiments, and various variations/changes are possible within the spirit of the invention.

What is claimed is:

1. A two-wheeled vehicle comprising:
a control circuit including at least one processor and at least one storage device and configured to set a warning line along a boundary line marked on a road between a traveling lane of a self-vehicle and an oncoming lane; and
a sensor configured to detect a difficult-to-travel region in the traveling lane,
wherein the control circuit is configured to determine whether it is difficult or possible for the self-vehicle to pass between the boundary line marked on the road and the difficult-to-travel region, when the difficult-to-travel region is detected by the sensor,
if it is determined that it is difficult for the self-vehicle to pass between the boundary line marked on the road and the difficult-to-travel region, the control circuit changes a position of the warning line along the boundary line marked on the road to a position shifted from the boundary line toward the oncoming lane side,
if it is determined that it is possible for the self-vehicle to pass between the boundary line marked on the road and the difficult-to-travel region, the control circuit does not change the position of the warning line along the boundary line marked on the road, and
wherein if the difficult-to-travel region is due to parking or stopping of a vehicle in the traveling lane, it is determined whether it is difficult or possible for the self-vehicle to pass between the boundary line marked on the road and the difficult-to-travel region, based on a type of the parked or stopped vehicle in the traveling lane.

2. A two-wheeled vehicle comprising:
a control circuit including at least one processor and at least one storage device and configured to set a warning line along a boundary line marked on a road between a traveling lane of a self-vehicle and an oncoming lane;
a warning device including a display and configured to issue a warning to a rider of the self-vehicle if the self-vehicle has crossed the warning line; and
a sensor configured to detect a difficult-to-travel region in the traveling lane and another vehicle traveling in the oncoming lane,
wherein the control circuit is configured to determine whether it is difficult or possible for the self-vehicle to pass between the boundary line marked on the road and the difficult-to-travel region, when the difficult-to-travel region is detected by the sensor,
if it is determined that it is difficult for the self-vehicle to pass between the boundary line marked on the road and the difficult-to-travel region, the control circuit changes a position of the warning line along the boundary line marked on the road to a position shifted from the boundary line toward the oncoming lane side,
if it is determined that it is possible for the self-vehicle to pass between the boundary line marked on the road and the difficult-to-travel region, the control circuit does not change the position of the warning line along the boundary line marked on the road regardless of whether or not the sensor detects the other vehicle in the oncoming lane, and
wherein if it is determined that it is possible for the self-vehicle to pass between the boundary line marked on the road and the difficult-to-travel region, and the sensor detects the other vehicle in the oncoming lane, the warning device issues a warning even if the self-vehicle has not crossed the warning line.

3. The two-wheeled vehicle according to claim 2, wherein if a distance between the boundary and the difficult-to-travel region is smaller than or equal to a predetermined distance, it is determined that it is difficult for the self-vehicle to pass.

4. The two-wheeled vehicle according to claim 2, wherein the sensor is an image sensor and/or a radar.

5. A control apparatus for a two-wheeled vehicle, the apparatus comprising:
a control circuit including at least one processor and at least one storage device and configured to set a warning line along a boundary line marked on a road between a traveling lane of a self-vehicle and an oncoming lane; and
a sensor configured to detect a difficult-to-travel region in the traveling lane, wherein the control circuit is configured to determine whether it is difficult or possible for the self-vehicle to pass between the boundary line marked on the road and the difficult-to-travel region, when the difficult-to-travel region is detected by the sensor, if it is determined that it is difficult for the self-vehicle to pass between the boundary line marked on the road and the difficult-to-travel region, the control circuit changes a position of the warning line along the boundary line marked on the road to a position shifted from the boundary line toward the oncoming lane side, if it is determined that it is possible for the self-vehicle to pass between the boundary line marked on the road and the difficult-to-travel region, the control circuit does not change the position of the warning line along the boundary line marked on the road, and wherein if the difficult-to-travel region is due to parking or stopping of a vehicle in the traveling lane, it is determined whether it is difficult or possible for the self-vehicle to pass between the boundary line marked on the road and the difficult-to-travel region, based on a type of the parked or stopped vehicle in the traveling lane.

6. A control apparatus for a two-wheeled vehicle, the apparatus comprising:

a control circuit including at least one processor and at least one storage device and configured to set a warning line along a boundary line marked on a road between a traveling lane of a self-vehicle and an oncoming lane;

a warning device configured to issue a warning if the self-vehicle has crossed the warning line; and a sensor configured to detect a difficult-to-travel region in the traveling lane and another vehicle traveling in the oncoming lane, wherein the control circuit is configured to determine whether it is difficult or possible for the self-vehicle to pass between the boundary line marked on the road and the difficult-to-travel region, when the difficult-to-travel region is detected by the sensor, if it is determined that it is difficult for the self-vehicle to pass between the boundary line marked on the road and the difficult-to-travel region, the control circuit changes a position of the warning line along the boundary line marked on the road to a position shifted from the boundary line toward the oncoming lane side, if it is determined that it is possible for the self-vehicle to pass between the boundary line marked on the road and the difficult-to-travel region, the control circuit does not change the position of the warning line along the boundary line marked on the road regardless of whether or not the sensor detects the other vehicle in the oncoming lane, and wherein if it is determined that it is possible for the self-vehicle to pass between the boundary line marked on the road and the difficult-to-travel region, and the sensor detects the other vehicle in the oncoming lane, the warning device issues a warning even if the self-vehicle has not crossed the warning line.

* * * * *